United States Patent [19]

Fathauer

[11] 4,009,799
[45] Mar. 1, 1977

[54] MONITOR FOR SEED PLANTING APPARATUS

[75] Inventor: George H. Fathauer, Mesa, Ariz.

[73] Assignee: Dickey-john Corporation, Auburn, Ill.

[22] Filed: Nov. 10, 1975

[21] Appl. No.: 630,253

[52] U.S. Cl. .................................... 221/3; 221/6
[51] Int. Cl.² ........................................ A01C 7/18
[58] Field of Search ............... 221/2, 3, 6, 13, 14, 221/21; 222/25, 27, 39; 340/259; 73/205; 111/1; 194/13

[56] References Cited
UNITED STATES PATENTS

| | | | |
|---|---|---|---|
| 3,912,121 | 10/1975 | Steffen | 221/13 |
| 3,921,159 | 11/1975 | Steffen | 340/259 X |
| 3,935,435 | 1/1976 | Greenwood | 194/13 |

Primary Examiner—Stanley H. Tollberg
Attorney, Agent, or Firm—Olson, Trexler, Wolters, Bushnell & Fosse, Ltd.

[57] ABSTRACT

A monitor for use in a multi-row seed planting apparatus is provided for detecting seeds passing from a seed bin to a plurality of seed dispensers and for indicating by row number an improperly operating dispenser. A seed sensor is placed in the seed flow path of each dispenser to provide an output signal indicating that seeds are continuously flowing along the seed flow path through the dispenser. A two-digit seven-segment readout display is provided on the monitor and is coupled to the seed dispenser through logic circuitry which energizes the readout display to indicate the row number of an improperly operating seed dispenser.

18 Claims, 9 Drawing Figures

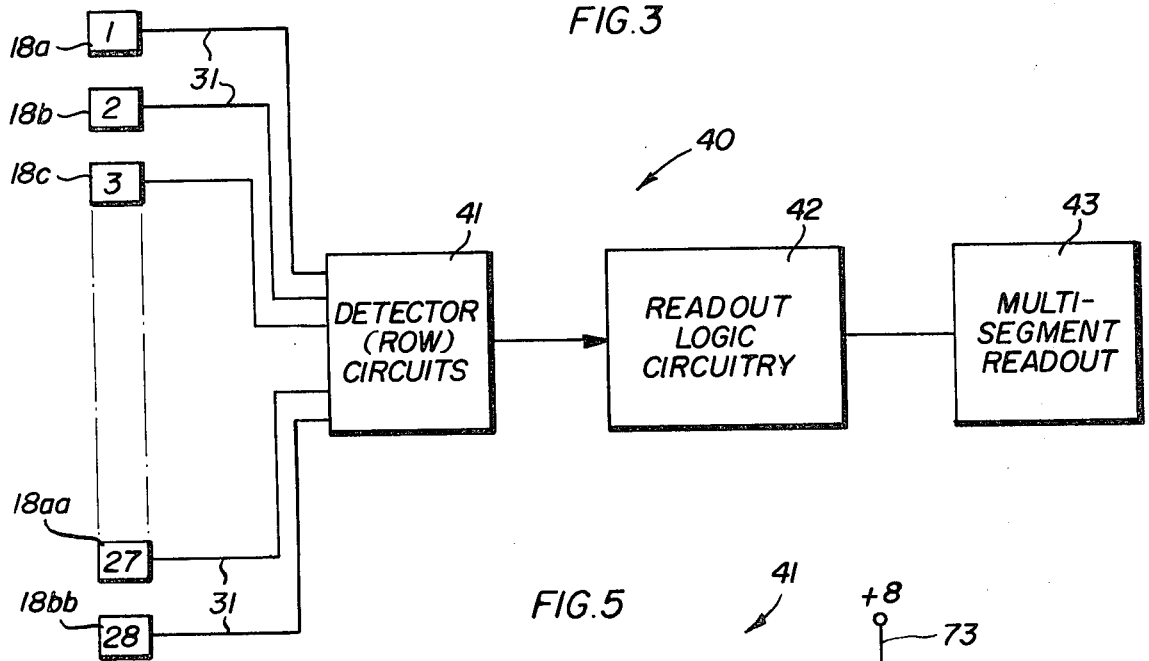
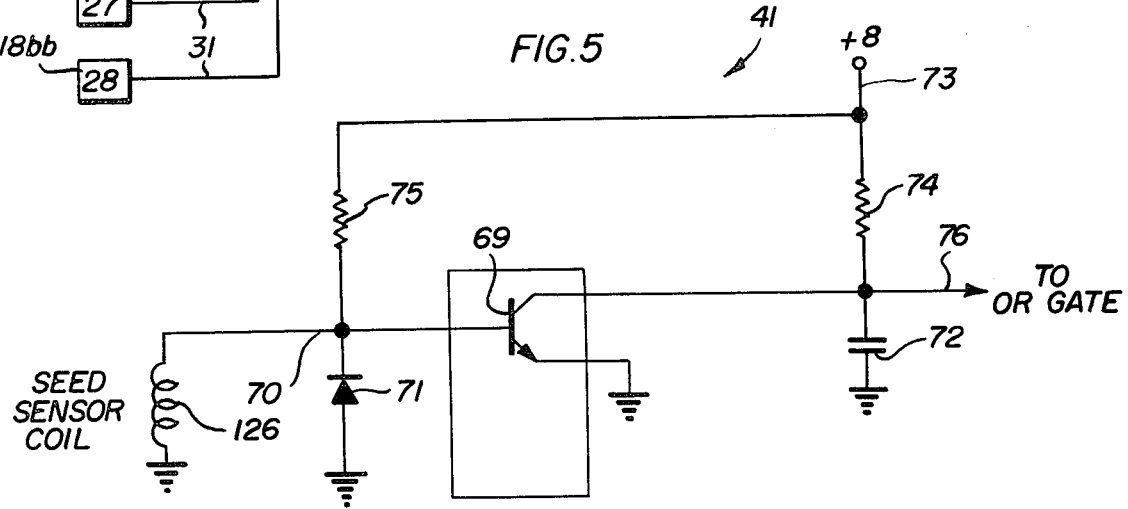
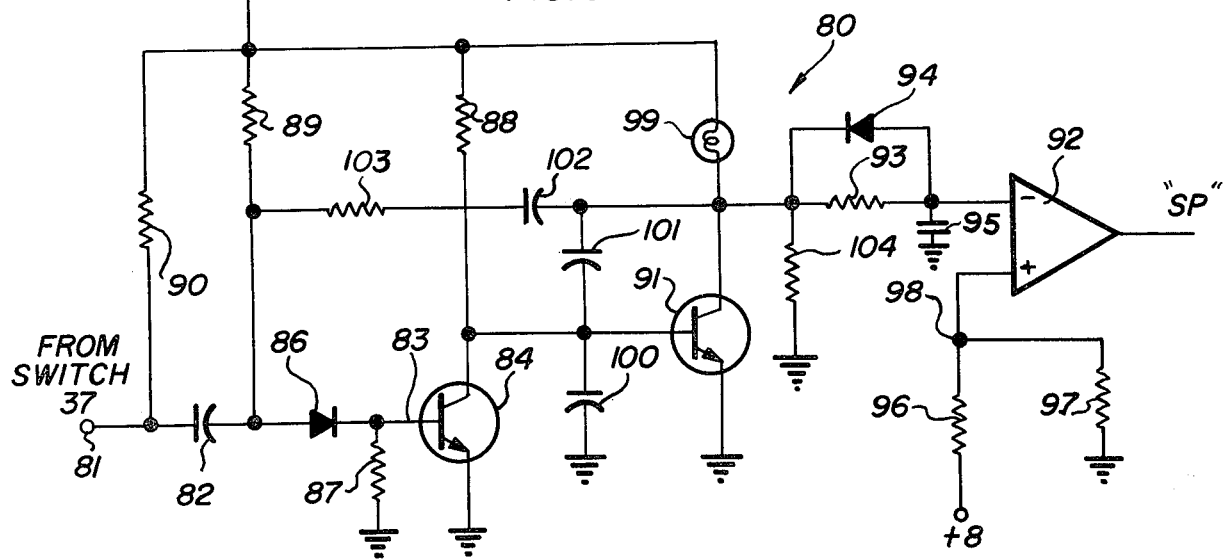

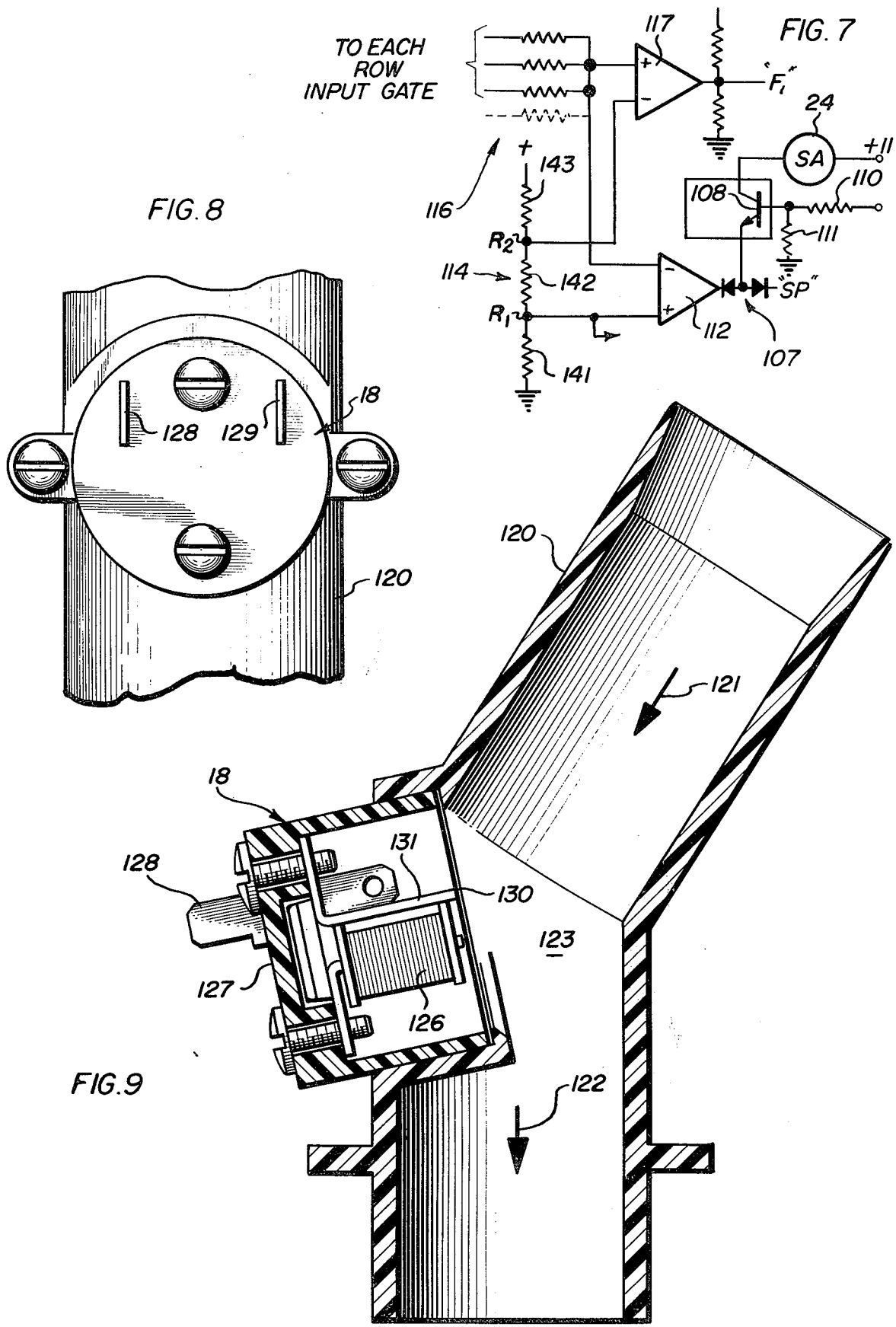

MONITOR FOR SEED PLANTING APPARATUS

BACKGROUND OF THE INVENTION

The present invention relates to monitoring apparatus, and more particularly to a novel arrangement for monitoring the passage of seeds in a multi-row seed planter. While certain features of this invention may be adapted for many different uses, the disclosure will be facilitated by directing it particularly to the problem of monitoring seeds being discharged in a multi-row seed planting machine.

As is well known in the agricultural industry, a farmer engaged in mechanized planting of various seeds utilizes planting machines pulled behind tractors or the like. Such planting machines usually include a plurality of separate planting devices supplied with seeds from either separate hoppers or from a large common hopper so that a plurality of rows of seeds may be planted at one time. With planting equipment heretofore in general use, it has been difficult for a farmer utilizing a relatively large multi-row planting apparatus to determine quickly which one of the plurality of rows has malfunctioned so that it can be corrected in a minimum of time. For example, when operating a 28-row planting machine, it is desirable to monitor each and every row separately so that the farmer can determine the operation of each seed dispensing unit. Generally, monitoring equipment heretofore utilized for such equipment has provided an indicator light which is either energized or deenergized in response to sensing a malfunction. However, in planting equipment having a multitude of rows of seed dispensers, such as twenty to thirty seed dispensers, it is more difficult and expensive to monitor each row utilizing a separate indicator light for each row.

SUMMARY OF THE INVENTION

Accordingly, it is an object of this invention to provide a simple and reliable apparatus for detecting and monitoring seeds passing through a plurality of seed dispensers of a multi-row seed planter and indicating which seed dispenser is malfunctioning.

Another object of this invention is to provide such an apparatus which will indicate when seed dispensers for two or more rows are malfunctioning simultaneously.

A feature of this invention is the utilization of a readout which includes one or more multiple-segment readout devices which are energized to identify the row number of the seed dispenser which is malfunctioning. The illustrated embodiment of the invention provides a "—" indication when all the dispensers are operating properly. When one of the dispensers malfunctions, the row number is shown such as "3", "12", "24", etc. However, should two or more of the dispensers simultaneously fail to operate properly, the readout will provide an "-F" indication.

Briefly, the planter monitor of the invention is designed to sense the presence or absence of seeds passing through the dispensers of the planter and produce corresponding visual displays by means of one or more multi-segment readout devices. The failure of a dispenser is indicated by identifying that particular row, either numerically, alphabetically, or by any other convenient system of designation. When a malfunction occurs in one or more dispensers, an audio alarm system is also energized to attract the attention of the tractor operator.

In addition, the system of the invention includes a shaft-rotation sensing unit which develops pulses at a rate corresponding to the speed of rotation of the power take-off shaft coupled between the planter and the tractor. A light on the monitor console flashes in response to the pulses and a detector circuit energizes the audio alarm if the shaft output pulse rate falls below a predetermined minimum value.

Basically, the system utilizes logic circuits which provide "zeros" and "ones" generated by a plurality of transistor switching circuits respectively connected to the output of each seed sensing element. The seed sensing elements preferably are electromagnetic devices each having a movable diaphragm which is struck by seeds en route through their respective seed dispensing paths. The seeds hitting the electromagnetic sensors generate voltage pulses which turn on the transistor switching circuits to discharge an associated capacitor to maintain a "zero" output state from the transistor switching circuit when seeds are being sensed. The capacitors of these transistor switching circuits charge to a supply voltage value when no seeds are sensed, thereby producing a logic "one" state at their output. While a logic "one" state is used to indicate a malfunction in the disclosed embodiment, it will be understood that a logic "zero" state can be used to indicate a malfunction, if desired.

For actuation of the audio alarm unit, the pulses which are developed by the shaft sensor and applied to the shaft rotation indicating lamp, are integrated to provide a logic "zero" state for normal (i.e., silent) operation of the alarm. When the shaft speed falls below a predetermined minimum, the signal applied to the alarm becomes a logic "one" which energizes the audio alarm.

Many other objects, features and advantages of this invention will be more fully realized and understood from the following detailed description when taken in conjunction with the accompanying drawings wherein like reference numerals of various views of the drawings are intended to designate similar elements or components.

BRIEF DESCRIPTION OF THE DRAWINGS

FIG. 3 is a simplified block diagram illustrating the multi-row monitor system of this invention;

FIG. 5 is a schematic circuit diagram illustrating the transistor switching circuit coupled to the output of each of the electromagnetic seed sensors;

FIG. 6 is a detailed schematic diagram of the shaft rotation sensor circuit which is incorporated in the multi-row seed monitor of this invention;

FIG. 7 is a schematic showing of the audio alarm circuit utilized in the multi-row seed monitor of this invention;

FIG. 8 is an end view of the electromagnetic seed sensing unit utilized in the multi-row seed monitoring system of this invention; and FIG. 9 is a side elevational sectional view of the seed sensing unit shown in FIG. 8.

DETAILED DESCRIPTION OF THE ILLUSTRATED EMBODIMENT

Figure 1:
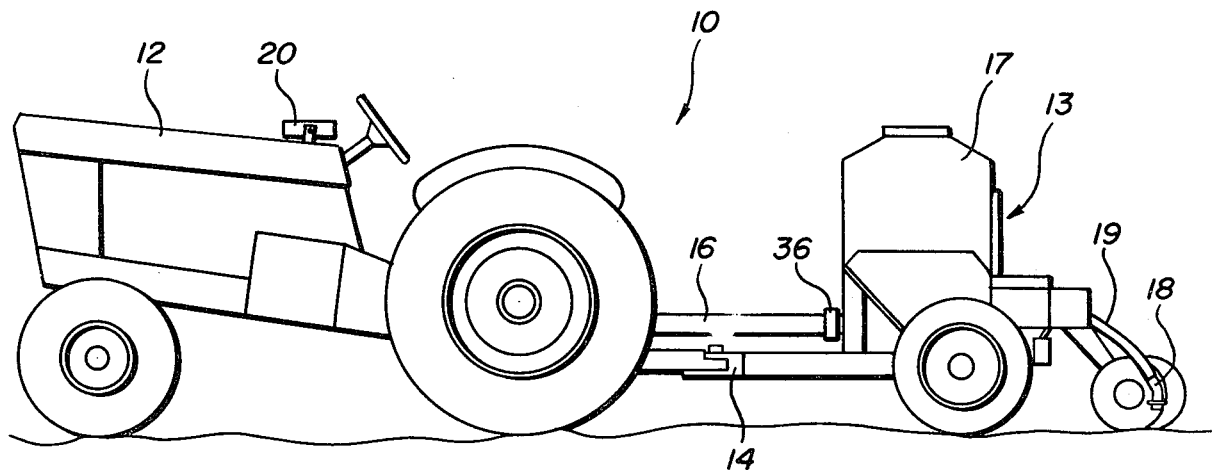
FIG. 1 is a side elevational view of a tractor and seed planting apparatus wherein the multi-row seed monitoring system of this invention is utilized.

Referring now to FIG. 1, there is shown a seed planting apparatus designated generally by reference numeral 10 which employs a monitor system constructed in accordance with the principles of the present invention. The seed planting apparatus 10 includes a vehicle, such as a tractor 12, which is coupled to a multi-row seed planter 13 by means of a tow bar connection 14. A rotating power shaft 16 is coupled between the tractor 12 and the planter 13 to provide operating power to the planter for distributing seeds from a hopper 17 to a plurality of seed dispensing and sensing units 18. The seeds pass through a seed flow path which is formed by a conduit 19.

In the embodiment shown for illustrating the invention, the number of seed planting dispensers and sensors is 28 and, therefore, the number of rows that can be planted at one time is also 28. It is understood the monitor may be adapted for planters having either a greater or lesser number of row dispensers. A seed distributor mechanism (not shown) within the hopper 17 is adapted to be driven directly by a mechanical coupling with the shaft 16, or by means of a hydraulic system operated by the rotation of the shaft 16. In some embodiments of the invention, of course, it may be desirable to use alternative means for powering planter 13 such as an electric motor energized by storage batteries or the electrical system of tractor 12.

Figure 2:
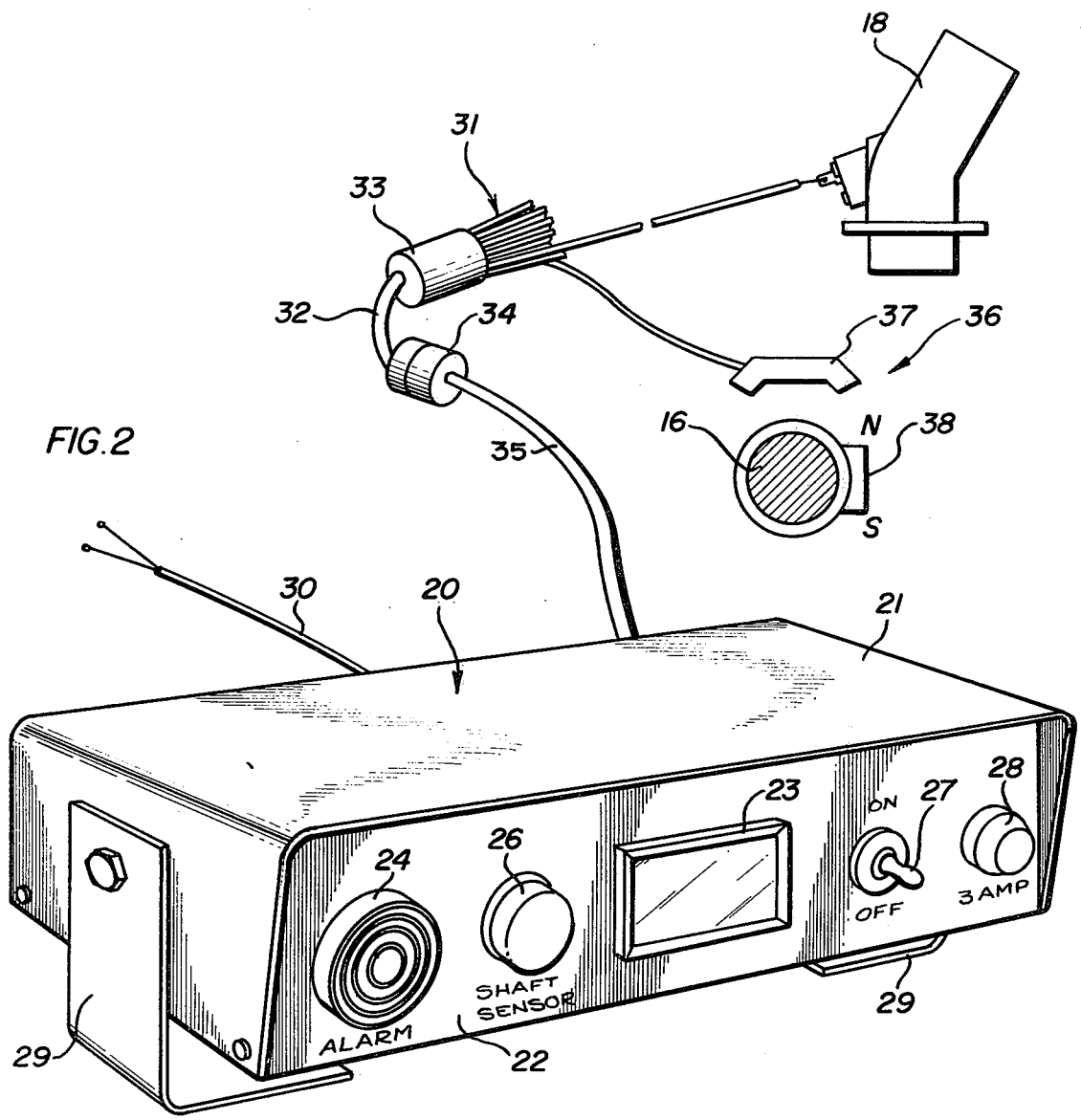
FIG. 2 is a perspective view of the seed monitor console and a schematic showing of one of the plurality of seed sensors and the shaft rotation sensor.

In accordance with this invention, a monitor console unit 20 is mounted on tractor 12 in a position which is viewable by the tractor operator. The monitor console unit provides a visual indication as well as an audio alarm system which are responsive to the operation of the seed planting apparatus 13. For a better understanding of the monitor console unit 20, reference is now made to FIG. 2 wherein monitor console unit 20 is shown having a housing or outer case 21 with a front wall 22 thereof providing a console panel upon which the appropriate indicating and alarm elements are mounted. A two-digit multi-segment readout display unit is mounted behind window 23 on the central portion of the console panel and an audio alarm unit 24 is mounted to the right side of the console panel. An indicating light 26 is mounted between the audio alarm unit 24 and readout display window 23. Indicating light 26 is operated in a continuously flashing manner when the shaft 16 is rotating. The circuitry within the monitor console is energized by the means of an on-off power switch 27 and the entire circuitry is protected by means of a fuse located in a fuse holder 28 mounted on the console panel 22.

The monitor console 20 is secured to the tractor by a pair of spaced-apart brackets 29. The monitor console 20 is also provided with a two-wire power cable which is indicated by reference numeral 30. Power is applied to the monitor console through cable 30 and is distributed by circuitry within monitor console 20 to a plurality of seed sensors 18 through a cabling arrangement which is indicated generally by reference numeral 31. Cables 31 may be combined into a single, smaller-diameter multi-conductor cable 32 by means of a connecting block 33 and, to simplify connection thereof, a connector plug 34 may be provided. The connector plug 34 is connected to a second multi-conductor cable 35 which is similar to cable 32 and is connected to the circuitry within monitor console 20. Monitor console 20 is coupled to a shaft rotation sensing means, which is designated generally by reference numeral 36 and provides an indication that the power shaft 16 is rotating properly. The shaft rotation sensor 36 includes a reed switch 37 which is actuated between open and closed circuit conditions as a result of a magnet 38 which is secured to the shaft 16 in a manner which causes it to pass in close proximity to reed switch 37 during each revolution of the shaft. Each shaft rotation therefore produces a switching action which is used to generate a pulse signal to cause indicator 26 to flash in unison with each rotation, as hereinafter described in greater detail.

Referring now to FIG. 3, there is seen a simplified block diagram of the circuitry which forms the monitor system constructed in accordance with the principles of this invention. The circuit is here designated generally by reference numeral 40. Circuit 40 preferably has most of the components thereof housed within the monitor console 20, of FIG. 2, and has a plurality of seed sensors 18a, 18b, 18c, through 18z and ending with 18aa, 18bb. The illustrated system is thus adapted to accommodate 28 sensors for monitoring a 28-row planter. The sensors 18a–18bb are coupled through their respective lines 31 to a plurality of corresponding detector circuits collectively designated by reference numeral 41. The outputs of detectors 41 are coupled to a readout logic circuit 42 which, in turn, is used to energize a multi-segment readout circuit designated generally by reference numeral 43. Readout circuit 43 is physically located in monitor console 20 behind window 23 of FIG. 2. The entire circuit configuration operates on digital logic and, therefore, is relatively simple and inexpensive to manufacture while providing a high degree of reliability and efficiency in use.

Figure 4:
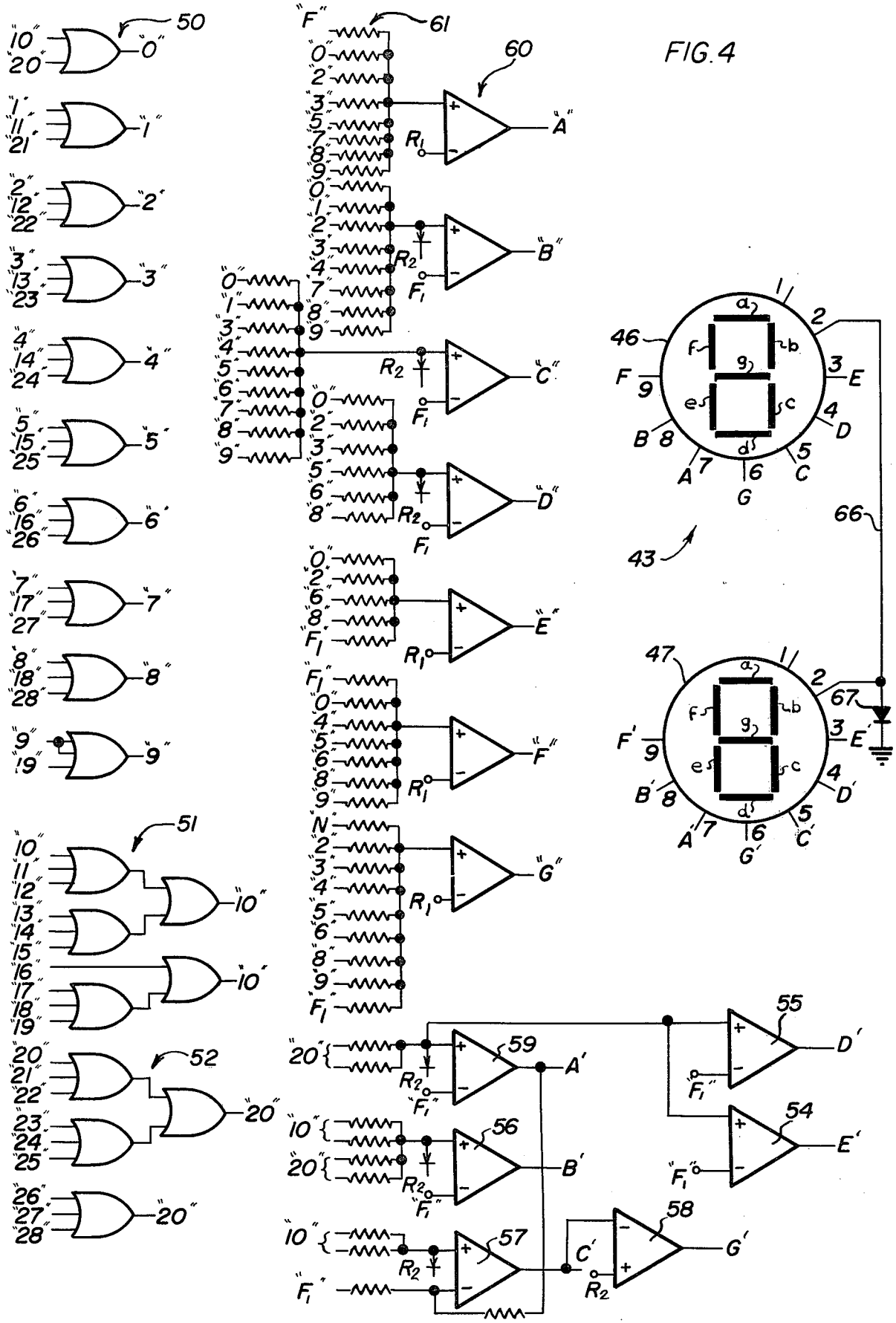
FIG. 4 is a detailed logic circuit diagram illustrating the circuitry utilized to control multi-segment readout devices such as seven segment digital displays.

FIG. 4 illustrates the details of the multi-segment readout logic circuitry 42 of the embodiment of the invention illustrated in FIG. 3. Logic circuitry 42 consists primarily of a plurality of OR gates 50 for numerical digits "0" through "9", a group of OR gates 51 for the "10" digit, and another group of OR gates 52 for the "20" digit. Applications of the invention involving greater numbers of dispensers may of course employ additional OR gate circuitry similar to that shown in FIG. 4. Readout logic circuitry 42 also comprises a plurality of operational amplifiers 60 with input signals coupled thereto by means of series resistors 61. All of the resistors 61 are preferably of the same value (e.g., one megohm). Each operational amplifier 60 develops an output signal which controls a particular segment of multi-segment readout device 46. Output "A" controls segment "a"; output "B", segment "b"; etc. Each operational amplifier 60 has its noninverting input terminal (marked with "+") connected to a plurality of resistors which in turn are connected to the outputs of the corresponding OR gates. For example, to energize the unit's digit "2", segments "a", "b", "g", "e", and "d" are used in that sequence; hence, the operational amplifiers 60 which develop outputs "A", "B", "G", "E", and "D" are coupled to the OR gate 50 which generates the unit's digit "2" (i.e., the OR gate having the "2","12", and "22" inputs).

The segments of the two-digit readout devices 46 and 47 are arranged in a standard seven segment pattern and indicate the unit's digits numbers and ten's digits respectively. To facilitate the understanding of the circuit arrangement, the interconnecting leads between the OR gates 50, operational amplifiers 60 and readout devices 46 and 47 are omitted. The output terminals of the OR gates are numbered "1" through "9" for the units and "10" and "20" for the numbers "10" through "19" and "20" through "28", respectively. The output of the operational amplifiers of readout logic circuitry 42 are labeled with letters A through G, respectively, and the corresponding letter designation is shown on the contacts of the seven segment readout devices 46 and 47. The readout devices 46 and 47, together with their associated circuitry, correspond to multi-segment readout 43 of FIG. 3.

The inputs to each of the OR gates are numbered according to the row number in which the seed sensor connected thereto is associated. Accordingly, the OR gate 50 for the "0" digit has two inputs which are associated with the seed dispensers numbered "10" and "20". The OR gate 50 for the "1" digit has three inputs associated with the seed dispensers numbered "1", "11" and "21". The remaining ones of OR gates 50 are similarly connected to their associated seed detectors. The numbers indicated at the output of the OR gates 50 represent the unit number which is to be displayed on the unit's readout device 46.

The numbered outputs of the OR gates are connected to the correspondingly numbered input resistors 61 of operational amplifiers 60 of display logic circuitry 42. For example, the operational amplifier 60 which develops the "A" output has its non-inverting input (marked "+") coupled to eight resistors which are labeled "F", "0", "2", "3", "5", "7", "8", and "9" because these eight unit's digits each require the "a" segment for their display. When, for example, a failure occurs in seed dispenser number 9, so that it is desired to display the number "9" on readout device 46, a "9" signal is developed by the corresponding OR gate 50 which is applied to all of the resistors labeled "9" of operational amplifiers 60. The outputs of these operational amplifiers are used to energize the five segments of the readout device 46 required to register the number "9" (i.e., segments "a", "b", "c", "f", and "g"). Another group of OR gates 51 is used to provide signals which identify seed planting rows from "10" to "19" inclusive. The OR gates 51 have their inputs coupled to the seed sensor associated with rows "10", "11", "12", "13", "14", "15", "16", "17", "18" and "19". These OR gates provide a pair of outputs which are numbered "10" to indicate that the signals from these gates are used to operate the ten's digit of readout device 47 for numbers "10" through "19". The outputs which are numbered "10" are connected to correspondingly numbered input lines of the ten's digit operational amplifiers 54–59. For example, some of the inputs to operational amplifier 56 and 57 are numbered "10" and are connected directly to the output of OR gates 51. The numbers from "20" through "28" are associated with a third group of OR gates 52. OR gates 52 are used to generate signals for numbers "20", "21", "22", "23", "24", "25", "26", "27" and "28". The final outputs of OR gates 52 are numbered "20" and are connected to some of the inputs of operational amplifiers 56 and 59.

The signals applied to operational amplifier 59 are also applied to operational amplifiers 54 and 55. The output of operational amplifier 57 also provides a signal to an operational amplifier 58. The outputs of the operational amplifiers 59, 56, 57, 55, 54, and 58 are identified A', B', C', D', E' and G' respectively. These outputs are connected to correspondingly identified terminals on the digital readout device 47. In this embodiment of the invention, the f segment is not used because, with 28 rows, only "1" and "2" are required for the ten's digits. The outputs from operational amplifiers 59, 56, 57, 55, 54, and 58, energize the corresponding segment of the seven segment device 47 to register a "1" for all numbers from "10" to "19" and to register a "2" for all numbers from "20" to "28".

The unit's digit readout device 46 is coupled to the ten's digit readout device 47 over a line 66 which, in turn, is connected to ground through a diode 67. Therefore, the segments of each seven segment device 46 and 47 are energized in parallel with the other segments and only a positive voltage is required at the input terminals labeled "A" through "G" and "A'" through "G'". The return current path is to ground via the diode 67. This positive potential is received from or switched by the outputs of the operational amplifiers and labeled "A" through "G" and "A'" through "E'" and "G'" for the unit's digits and ten's digits respectively.

FIG. 5 illustrates one form of a detector circuit which can be used between the seed sensors 18a–18bb and the input terminals of the OR gates 50. The switching circuit is designated generally by reference numeral 41 and includes an NPN transistor 69 which may be part of the integrated circuitry associated with the gate circuits and which, in turn, can be formed from a part of a large scale integration (LSI) circuit chip. The base electrode of transistor 69 is coupled to its associated seed sensor by a line 70 which has a diode 71 having its cathode connected thereto and its anode connected to ground. The collector of transistor 69 is connected to a capacitor 72 and to a voltage source (e.g., +8 volts) by line 73 through a resistor 74. A biasing resistor 75 is also connected to the voltage source and provides operating bias to the transistor so that it is normally in its non-conductive state which permits capacitor 72 to charge to the value of the supply voltage (here, +8 volts) through resistor 74 to produce a logic "one" on output line 76. Signals received from the seed sensor coil 126, however, bias transistor 69 on and thereby ground capacitor 72, which produces a logic "zero" at output line 76. It is understood that the monitor system of the invention includes separate detector circuits 41 for each of the sensors 18a through 18bb and each provides an output line 76. Line 76 therefore corresponds to any one of the plurality of input lines associated with the inputs to the OR gates 50.

FIG. 6 is a schematic illustration of the shaft rotation sensor means which is associated with the monitoring circuit of this invention and is designated generally by reference numeral 80. Reed switch 37 (see FIG. 2) is connected between input terminal 81 and ground to cooperate with resistor 90 and the voltage source (e.g., +11 volts) to develop a pulse whenever reed switch 37 is closed by magnet 38 passing near due to the rotation of shaft 16 (see FIG. 2). These pulses are coupled to the base electrode 83 of a normally on switching transistor 84 through a capacitor 82 and a forward-biased diode 86. When transistor 84 is on, a second switching transistor 91, whose base is connected to the collector of transistor 84, is turned off so that the pulses applied to the base of transistor 84 turns it off and thus turns transistor 91 on, which energizes an indicator lamp 99 that is connected in series with the collector of transistor 91.

In the specific circuit illustrated in FIG. 6, transistor 84 has the collector electrode thereof coupled to an 11-volt positive potential through a series connected load resistor 88. The anode of diode 86 is also coupled to the 11-volt positive potential through a resistor 89. A resistor 90 has one end thereof coupled to the input of capacitor 82 and the other end coupled to the positive 11-volt line.

The output at the collector of transistor 91 is also coupled to the inverting input (marked "−") of an operational amplifier 92 through a coupling resistor 93, which has a diode 94 connected in parallel therewith as shown. The resistor 93 and diode 94 provide a relatively low-resistance current path in one current direction, through the forward conductive current direction of diode 94, and a high resistance current path in the other current direction, through resistor 93. In this embodiment of the invention, the non-inverting input (marked "+") of operational amplifier 92 is coupled to an 8-volt reference source through a resistor 96. A second resistor 97 is also coupled to the non-inverting input of the operational amplifier, with the other end being connected to ground. By making resistors 96 and 97 of the same value (preferably in the order of 100 K ohms) a voltage divider circuit is provided with a voltage at circuit point 98 which is one half that of the reference voltage applied to resistor 96. Operational amplifier 92 is therefore operated in a differential amplifier mode and will produce output pulses when the input signals passing through resistor 93 exceed approximately 4 volts.

As referred to hereinabove, connected in series with transistor 91 is an indicating lamp 99 which corresponds to the shaft sensor indicator 26 on the console panel 22 of the monitor console 20. Each time a pulse is detected, the light 99 is energized. Transistor 91 has the base electrode thereof coupled to ground potential through a first capacitor 100. The base electrode of this transistor is also coupled through a second capacitor 101 to a third capacitor 102 connected in series with a resistor 103. A small amount of current passes continuously through the indicating lamp 99 is a result of a current path through a series connected resistor 104 in shunt relation with the collector emitter electrodes of a transistor 91.

The output of the operational amplifier 92, which is represented by the reference character "SP", is coupled to the audio alarm circuit of the monitor through a diode OR gate 107, as shown in FIG. 7, which is connected to the emitter electrode of an NPN switching transistor 108. Transistor 108, together with transistor 69 may be formed on the same integrated circuit chip. The audio alarm 24 is connected in series with the collector of transistor 108. Transistor 108 receives operating bias through a pair of resistors 110 and 111. Therefore, should the shaft rotation stop or slow down below a predetermined minimum level, as determined by the reference voltage applied to operational amplifier 92 of FIG. 6, the output pulses at "SP" from the shaft rotation sensing circuit 80 of FIG. 6 will cause energization of transistor 108 to actuate audio alarm 24.

In the embodiment of the invention illustrated in FIG. 7, an operational amplifier 112 has its non-inverting input coupled to the resistor circuit point indicated by R1 at the junction of resistor 141 and 142 which, together with resistor 143, provide a voltage divider network designated generally by reference numeral 114. The voltage divider network 114 comprises three resistors connected in series to provide different voltages at resistor circuit points R1 and R2. A resistor input matrix 116, here indicated as containing ten resistors (only four are actually shown), is coupled to the non-inverting input of a second operational amplifier 117 and to the inverting input of operational amplifier 112. Resistor circuit point R2 is connected to the inverting input of operational amplifier 117. The output of operational amplifier 117 is designated by reference character "F1" and is coupled to all of the correspondingly labeled "F1" terminals of the logic circuit shown in FIG. 4. Similarly, the resistor circuit points labeled R1 and R2 are connected to all of the correspondingly labeled circuit points of FIG. 4. The value of the resistors 116 at the input of operational amplifier 117 are so selected that two or more dispenser failure signals are required to produce an output signal at output line F1 of the output of operational amplifier 117. The representation "−F" will then be seen on the digit display to indicate to the operator that two or more rows are malfunctioning.

Referring now to FIGS. 8 and 9, there is seen a seed sensor 18 which can be utilized in accordance with the concepts of this invention. The seed sensor 18 is secured to a housing 120 which has a first seed direction path 121 and a second seed direction path 122. The bend portion 123 of the housing 120 receives the sensor 18. The sensor 18 is an electro-magnetic device having an electro-magnetic coil element 126 mounted in a secondary housing 127. The electro-magnetic coil 126 receives single information as a result of a moving diaphragm 130 of magnetic material such as thin sheet steel. The diaphragm 130 is placed in close proximity to the magnetic housing structure 131 of the electromagnetic coil 126. Seeds traveling along the direction of the path 121 strike the diaphragm and cause an output signal to be developed. Therefore, should seeds cease to pass through the seed path toward the dispenser, the appropriate output signals will be lacking and a row number will be registered on the two-digit readout display 43. The output signals of the coil 126 are applied to spaced apart terminals 128 and 129.

While a single specific embodiment of the present invention has been illustrated herein, it will be understood that variations and modifications may be affected without departing from the spirit and scope of the novel concepts as set forth in the following claims.

The invention is claimed as follows:

1. An apparatus for detecting and monitoring seeds passing through a plurality of seed dispensers of a multi-row planter in which said planter is pulled by a tractor means and is powered by a rotary shaft coupled between said planter and said tractor means, comprising: a plurality of seed detecting circuit means respectively associated with said seed dispensers, readout display means, logic circuit means coupled between said seed detecting circuit means and said readout display means and responsive to output signals from said seed detecting circuit means for energizing said readout display means to identify which of said dispensers is operating improperly; shaft rotation sensing means coupled to said shaft for developing a shaft signal corresponding to the rotational speed of said shaft; and indicating means coupled to said shaft rotation sensing means and responsive to said shaft signal for visually indicating that the shaft is rotating.

2. Apparatus in accordance with claim 1, which further includes audio alert means coupled to said shaft rotation sensing means and responsive to said shaft signal corresponding to a shaft speed below a predetermined speed for developing an audio alert signal.

3. An apparatus for detecting and monitoring seeds passing through a plurality of seed dispensers of a multi-row planter, comprising: a plurality of seed detecting circuit means respectively associated with said seed dispensers for developing a corresponding plurality of output signals in response to the passage of seeds through said seed dispensers; readout display means; and logic circuit means, including a plurality of OR gates respectively coupled to said seed detecting circuit means and coupled to said display means, responsive to said output signals from said seed detecting circuit means for energizing said readout display means to identify which of said dispensers is operating improperly.

4. An apparatus for detecting and monitoring seeds passing through a plurality of dispensers of a multi-row planter as set forth in claim 3, wherein said readout means includes a pair of seven-segment readout devices.

5. An apparatus for detecting and monitoring seeds passing through a plurality of seed dispensers of a multi-row planter, comprising: a plurality of seed detecting circuit means respectively associated with said seed dispensers, said seed detecting circuit means including an electro-magnetic coil, diaphragm means of magnetic material placed adjacent said electro-magnetic coil and being positioned adjacent the seed flow path of said planting apparatus and arranged to be actuated by seeds passing through the dispensing apparatus; readout display means, and logic circuit means coupled between said seed detecting circuit means and said readout display means and responsive to output signals from said seed detecting circuit means for energizing said readout display means to identify which of said dispensers is operating improperly.

6. A seed monitor for a multi-row seed planter having a plurality of seed dispensers arranged on said planter to dispense seeds in a corresponding plurality of rows with each dispenser being designated individually and in which said planter is pulled by a tractor means and is powered by a rotary shaft coupled between said planter and said tractor means, said monitor comprising: readout display means for individually displaying the designation of each of said dispensers; a corresponding plurality of detector means respectively responsive to seeds passing through said seed dispensers for producing corresponding seed signals in response to a predetermined condition; circuit means coupled to said detector means and responsive to the absence of said seed signals for any one of said seed dispensers for energizing said multi-segment readout display means to visually indicate the designation of said one seed dispenser, whereby the identity of the malfunctioning seed dispenser is displayed; shaft rotation sensing means coupled to said shaft for developing a shaft signal corresponding to the rotational speed of said shaft; and indicating means coupled to said shaft rotation sensing means and responsive to said shaft signal for visually indicating that the shaft is rotating.

7. A seed monitor in accordance with claim 6, which further includes audio alert means coupled to said shaft rotation sensing means and responsive to said shaft signal corresponding to a shaft speed below a predetermined speed for developing an audio alert signal.

8. A seed monitor for a multi-row seed planter having a plurality of seed dispensers arranged on said planter to dispense seeds in a corresponding plurality of rows with each dispenser being designated individually, said monitor comprising: readout display means for individually displaying the designation of each of said dispensers, a corresponding plurality of detector means respectively responsive to seeds passing through said seed dispensers for producing corresponding seed signals in response to a predetermined condition; circuit means, including a plurality of OR gates respectively coupled to said seed detector means, responsive to the absence of said seed signals for any one of said seed dispensers for energizing said readout display means to visually indicate the designation of said one seed dispenser, whereby the identity of the malfunctioning seed dispenser is displayed; and switch means coupled between said OR gates and said readout display means.

9. A monitor as set forth in claim 8, wherein said readout display means includes a pair of seven-segment readout devices.

10. A seed monitor for a multi-row seed planter having a plurality of seed dispensers arranged on said planter to dispense seeds in a correspondint plurality of rows with each dispenser being designated individually, said monitor comprising: readout display means for individually displaying the designation of each of said dispensers; a corresponding plurality of detector means respectively responsive to seeds passing through said seed dispensers for producing corresponding seed signals in response to a predetermined condition, said seed detector means including a sensor comprising an electro-magnetic coil and diaphragm means positioned adjacent said coil and adjacent a flow path of seeds being planted and movable in response to seeds passing through the dispensing apparatus for providing signals representing seed flow; and circuit means coupled to said detector means and responsive to the absence of said seed signals for any one of said seed dispensers for energizing said readout display means to visually indicate the designation of the corresponding seed dispenser, whereby the identity of the malfunctioning seed dispenser is displayed.

11. An apparatus for detecting and monitoring seeds passing through a plurality of seed dispensers of a multi-row planter, comprising: a plurality of seed detecting circuit means respectively associated with said seed dispensers; multi-segment readout display means; logic circuit means including timing means coupled between said seed detecting circuit means and said multi-segment readout display means and responsive to output signals from said seed detecting circuit means for developing a corresponding switching signal; and switching means responsive to said switching signal for energizing said multi-segment readout display means to identify which of said dispensers is operating improperly.

12. An apparatus for detecting and monitoring seeds passing through a plurality of seed dispensers of a multi-row planter as set forth in claim 11, wherein said logic circuit means further includes means for developing a switching signal indicative of the condition that all of said seed dispensers are operating properly, whereby said switching means energizes said multi-segment readout display means to indicate said condition.

13. An apparatus for detecting and monitoring seeds passing through a plurality of seed dispensers of a multi-row planter as set forth in claim 11, wherein said logic circuit means further includes means for developing a switching signal indicative of the condition that more than one of said seed dispensers are malfunctioning, whereby said switching means energizes said multi-segment readout display means to indicate said condition.

14. An apparatus for detecting and monitoring seeds passing through a plurality of seed dispensers of a multi-row planter as set forth in claim 11, which further includes an audio alert means coupled to said logic circuit means for producing an audio signal in response to a malfunction sensed by any one of said plurality of seed detecting circuit means.

15. A seed monitor for a multi-row seed planter having a plurality of seed dispensers arranged on said planter to dispense seeds in a corresponding plurality of rows with each dispenser being designated individually, said monitor comprising: multi-segment readout display means for individually displaying the designation of each of said dispensers; a corresponding plurality of detector means respectively responsive to seeds passing through said seed dispensers for producing corresponding seed signals in response to a predetermined condition; circuit means including timing means coupled to said detector means and responsive to the absence of said seed signals for any one of said seed dispensers for developing a corresponding switching signal; and switching means responsive to said switching signal for energizing said multi-segment readout display means to visually indicate the designation of the corresponding seed dispenser, whereby the identity of the malfunctioning seed dispenser is displayed.

16. A seed monitor as set forth in claim 15, wherein said detector means further includes means responsive to the presence of said seed signals from all of said seed detector means for developing a switching signal indicative of said presence for causing said switching means to energize said multi-segment readout display means to indicate a first unique designation, whereby the monitor indicates that all of the seed dispensers are functioning properly.

17. A monitor as set forth in claim 15, wherein said detector means further includes means responsive to the absence of said seed signals from more than one of said seed detector means for developing a switching signal indicative of said absence for causing said switching means to energize said multi-segment readout display means to indicate a second unique designation, whereby the monitor indicates that more than one of said seed dispensers are malfunctioning.

18. A monitor as set forth in claim 15, which further includes an audio alert means coupled to said detector means and responsive to the absence of said control signal for producing an audio signal, whereby the monitor audibly alerts the operator of the planter that a dispenser is malfunctioning.

* * * * *

Disclaimer 4,009,799.—*George H. Fathauer*, Mesa, Ariz. MONITOR FOR SEED PLANTING APPARATUS. Patent dated Mar. 1, 1977. Disclaimer filed Aug. 25, 1978, by the assignee, *Dickey-john Corporation*.

Hereby enters this disclaimer to claims 11, 13, 14, 15, 17 and 18 of said patent.

[*Official Gazette October 17, 1978.*]